United States Patent [19]
Akeyson

[11] 3,955,513
[45] May 11, 1976

[54] COMBINED CULTIVATING AND PARTICLED MATERIAL APPLYING GARDENING TOOL

[76] Inventor: Swan M. Akeyson, 762 Walnut, Long Beach, Calif. 90813

[22] Filed: Aug. 26, 1974

[21] Appl. No.: 500,410

[52] U.S. Cl............................ 111/8; 222/268; 172/378
[51] Int. Cl.². .................. A01C 7/00; A01C 19/00
[58] Field of Search ............ 111/10, 11, 8, 95, 96, 111/92; 222/363, 368, 471

[56] References Cited
UNITED STATES PATENTS

| | | | |
|---|---|---|---|
| 267,775 | 11/1882 | Chipman | 111/95 |
| 517,487 | 4/1894 | Schendzelos | 111/96 |
| 950,286 | 2/1910 | Hauty | 222/368 X |
| 2,196,129 | 4/1940 | Swisher | 172/378 X |
| 2,530,886 | 11/1950 | Maisel | 111/8 X |
| 2,734,468 | 2/1956 | Jones | 111/92 X |

Primary Examiner—Stephen C. Pellegrino
Attorney, Agent, or Firm—William C. Babcock

[57] ABSTRACT

A device in which a single elongate shaft serves to support a tined structure for the cultivation of ground, a hopper for holding a quantity of a particled material such as fertilizer or the like that will have a beneficial result when applied to the soil, and manually operated means that are longitudinally movable relative to the handle for intermittently causing a metered quantity of the particled material to be discharged from the hopper onto the ground, either concurrently with the cultivation of the ground, or prior to or after the cultivation.

3 Claims, 5 Drawing Figures

U.S. Patent   May 11, 1976   3,955,513
FIG.1
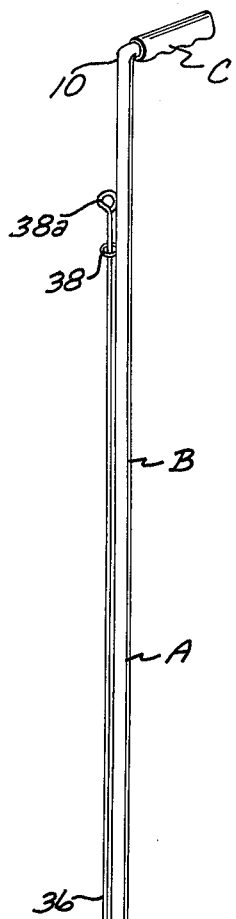
FIG.2
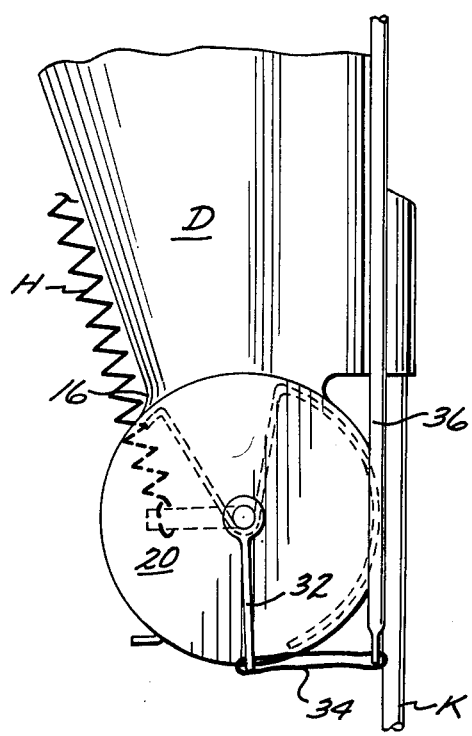
FIG.3
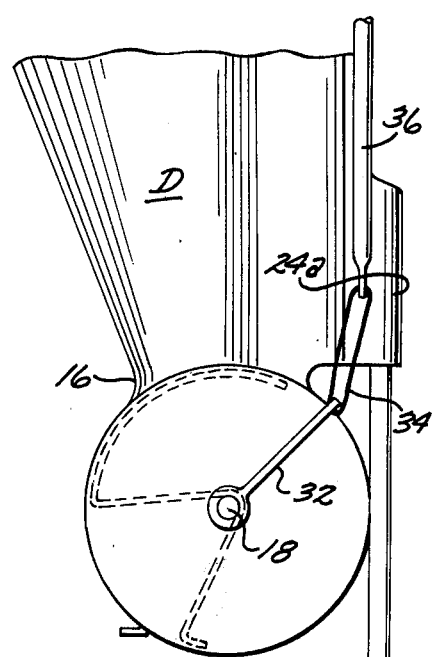
FIG.4
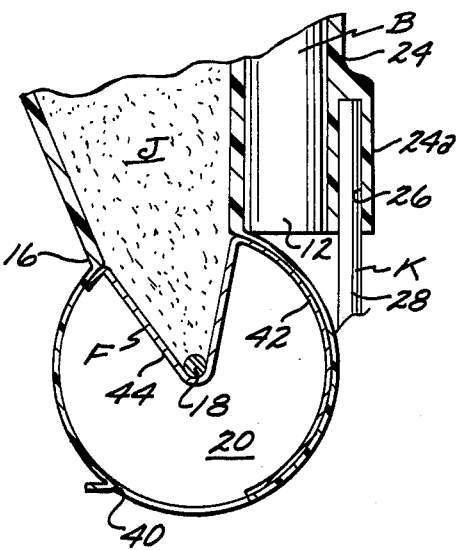
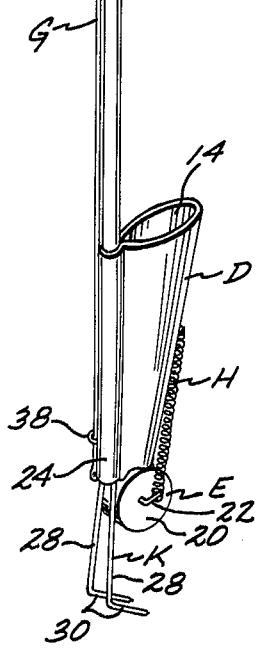
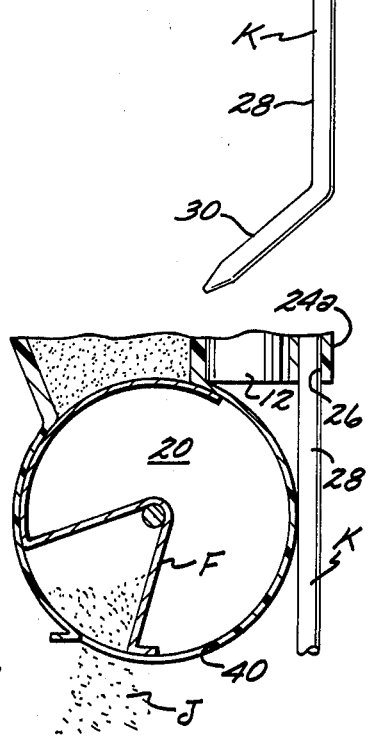
FIG.5

COMBINED CULTIVATING AND PARTICLED MATERIAL APPLYING GARDENING TOOL

BACKGROUND OF THE INVENTION

1. Field of the Invention

Combined cultivating and particled material applying gardening tool.

2. Description of the Prior Art

In the gardening of small plots of ground it is convenient to utilize a single tool that is capable of effecting light cultivation of the ground surface, and also adapted to selectively and intermittently apply metered quantities of the particled material such as fertilizer or the like to the ground surface.

The major object of the present invention is to supply a compact, light weight, inexpensive gardening device that may be selectively employed to cultivate the ground surface and intermittently apply metered quantities of a particled material such as fertilizer or the like thereto, and one in which a single shaft is employed to support a tined structure for cultivation, a hopper for holding a quantity of the particled material, and means to control the discharge of either quantities of the particled material from the hopper onto the ground surface.

SUMMARY OF THE INVENTION

A gardening tool that includes a single elongate shaft that has first and second ends, with the first end of the shaft supporting a tined structure for cultivation of the ground, and the second end a handle that may be grasped when the invention is in use. The shaft adjacent the first end thereof supports an elongate hopper in which a quantity of the particled material may be disposed, with the hopper having a first upper end and a second lower end. The second lower end of the hopper is in communication with a cylindrical housing having a discharge opening therein, and the housing rotatably supporting a structure for dispensing a metered quantity of the particled material through the discharge opening previously mentioned.

The shaft also movably and longitudinally supports a control device for intermittently rotating the metering structure to cause a metered quantity of the particled material to be discharged onto the ground either concurrently with the cultivating thereof by the tined structure, or before or after the cultivating of the ground has been achieved by use of the invention.

BRIEF DESCRIPTION OF THE DRAWINGS

FIG. 1 is a perspective view of the soil cultivating and particled material applying device;

FIG. 2 is a fragmentary side elevational view with a rotatable metering device in a first position;

FIG. 3 is the same view as shown in FIG. 2 but with the metering device having been rotated to a second position to discharge a metered quantity of particled material onto the ground surface;

FIG. 4 is a fragmentary longitudinal cross sectional view of a portion of the device shown in FIG. 2 and illustrating the manner in which particled material discharges from the hopper into the metering device which metering device at all times tends to assume the first position due to a tensioned helical spring; and FIG. 5 is a fragmentary longitudinal cross sectional view of the device in the same position as shown in FIG. 3 and illustrating the manner in which a metered quantity of the particled material discharges through an opening formed in a housing associated with the hopper.

DESCRIPTION OF THE PREFERRED EMBODIMENT

The invention A as may be seen in the drawing includes an elongate rigid shaft B that has a first upper end 10 and lower end 12. A handle C extends outwardly at an angle from the first end 10 of the shaft B. A hopper D is secured to the lower portion of the shaft B adjacent the second end 12 thereof. A cylindrical housing E is situated below the hopper D. The hopper D has a first end 14 that is preferably open and through which granular or particled material J may be discharged into the confines of the hopper. The hopper D includes a second lower end 16 that is in communication with the cylindrical housing E.

The cylindrical housing E has a rotatable metering device F mounted therein, which is rigidly secured to a rod 18 of circular transverse cross section. The rod 18 is journaled in end pieces 20 of the housing E. A manually operated control mechanism G for actuating the metering device F is longitudinally and movably supported from the shaft B as shown in FIG. 1. The rod 18 on the first end thereof develops into a normally disposed arm 22. A tensioned helical spring H is connected to the first arm 22, with the upper end of the spring being affixed to the hopper D as may be seen in FIG. 1. The spring H at all times tends to maintain metering device F in the first position shown in FIGS. 2 and 4. The hopper D has a tubular sleeve 24 secured thereto that is rigidly secured to the shaft B adjacent the second end 12 of the latter by conventional means (not shown). The sleeves 24 include a lower portion 24a of increased thickness, in which a number of elongate cavities 26 are formed that extend upwardly from the lower ends of the enlarged portion 24a as viewed in FIGS. 4 and 5, and these cavities being engaged by the upper portions of the elongate tines K.

The tines K are each of L shaped configuration and include upper portions 28, and lower portions 30 that angle downwardly and outwardly from the upper portions as can best be seen in FIGS. 1 and 3. The rod 20 on the end opposite that from which the arm 22 projects has a second arm 32 secured thereto exteriorly of the end piece 20 most adjacent thereto by conventional fastening means. The second arm 32 is pivotally connected to a link 34 preferably formed from heavy wire. The second arm 32, link 34 and elongate rigid member 36 to which the link 34 is pivotally connected comprise the control mechanism for pivoting the metering device F from the first position shown in FIG. 4 to the second position illustrated in FIG. 5. The elongate member 36 is longitudinally movable relative to the shaft B and is movably supported therefrom by a number of spaced ferrules 39 that extend outwardly from the shaft.

The housing E as can be seen in FIGS. 4 and 5 has a granular material discharge opening 40 defined in the lower portion thereof. The rotatable metering device F is a semi-cylindrical shell 42 of slightly less length than the housing E. The shell 42 has a V-shaped metering chamger 44 defined therein which metering chamber at the apex thereof is rigidly secured to the portion of the shaft 18 within the interior of the housing E as shown in FIGS. 4 and 5. The upper end of the elongate member 38 is preferably formed into a loop 38a to permit the same to be easily grasped by the user. The spring H at all times tends to maintain the metering device F in the first position shown in FIGS. 2 and 4 where the particled material J will discharge downwardly thereinto from hopper D. By longitudinal movement of the elongate member 36 relative to the shaft B, the metering device F may be pivoted to the second position shown in FIGS. 3 and 5 to dispense a metered amount of material J and when the elongate member 36 is released, the spring H will pivot the metering device G to the second position shown in FIGS. 2 and 4.

The invention A by grasping the shaft B and handle C may be used to cultivate the ground surface (not shown) by use of the tine structure K, and the granular material J capable of being discharged in metered quantities onto the ground as the cultivating operation proceeds or before or after the cultivation operation by manipulation of the elongate member 36 to move the rotatable metering device member M from the first to the second position.

The use and operation of the invention has been described previously in detail and need not be repeated.

I claim:

1. A gardening device that is capable of being used to subject the ground surface to a raking action as well as a light hoeing action and to subsequently apply a metered quantity of a particled material that is beneficial to plant growth to the ground surface that has been cultivated by the device, said device including:
    a. an elongate shaft having first and second end portions;
    b. a plurality of tines having first and second end portions, said second end portions of said tines angularly disposed relative to said first end portions thereof;
    c. an integrally formed assembly that includes a tubular sleeve having first and second ends, an elongate hopper extending outwardly from said sleeve and longitudinally disposed relative thereto, a cylindrical housing supported from the end of said hopper most adjacent said second end of said sleeve, said housing including two spaced end pieces, said housing having a particled material discharge opening therein situated below said second end of said sleeve, and a protuberance that extends outwardly from said second end of said sleeve, said protuberance having a plurality of spaced cavities that extend upwardly therein and frictionally engage said first end portions of said tines to support the latter from said assembly, and said sleeve having said second end portion of said shaft extending thereinto and secured thereto;
    d. rotatable metering means in said housing, said metering means when in a first position receiving and holding a metered quantity of said particled material from said hopper through said second end thereof, and said metering means when pivoted to a second position discharging said metered quantity of said particled material by gravity through said discharge opening to fall to the ground surface, said rotatable metering means including:
        1. a rod of circular transverse cross section journalled in said end pieces and extending therebetween, said rod having first and second arms extending outwardly from opposite ends thereof; and
        2. at least a portion of a cylindrical shell in said housing rigidly secured to said rod, said shell having a metering chamber therein that receives said granular material from said hopper when aligned with said second end thereof, with said chamber discharging said granular material through said discharge opening when aligned with the latter, and said manually operated means being pivotally connected to said first arm;
    e. spring loaded means that engage said first arm and at all times tend to maintain said metering means in said first position;
    f. a rod movably connected to said second arm and extending upwardly fron said second arm in a longitudinal position relative to said shaft; and
    g. guide means on said shaft that slidably engage said rod and movably support said rod in said longitudinal position with said rod when moved longitudinally relative to said shaft in a first direction rotating said shall to dispense a metered quantity of said particled material through said discharge opening in said housing onto the ground surface.

2. A device as defined in claim 1 that in addition includes:
    h. linkage means that connect said rod to said second arm.

3. A device as defined in claim 1 that in addition includes:
    h. a first handle that extends outwardly at an angle from said first end portion of said shaft; and
    i. a second handle on the free end of said rod.

* * * * *